United States Patent
Watanabe

(10) Patent No.: US 7,142,762 B2
(45) Date of Patent: Nov. 28, 2006

(54) INJECTION MOLD FOR LIGHT GUIDE BODY AND APPARATUS FOR MANUFACTURING LIGHT GUIDE BODY USING SAME

(75) Inventor: Seiichi Watanabe, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/169,771

(22) Filed: Jun. 30, 2005

(65) Prior Publication Data

US 2006/0002679 A1    Jan. 5, 2006

(30) Foreign Application Priority Data

Jun. 30, 2004    (JP)    ............... 2004-193167

(51) Int. Cl.
   *G02B 6/00*    (2006.01)
(52) U.S. Cl. ...................... 385/134; 385/147
(58) Field of Classification Search ................ 385/134, 385/147
   See application file for complete search history.

(56) References Cited

U.S. PATENT DOCUMENTS

| | | | | |
|---|---|---|---|---|
| 4,990,077 A | * | 2/1991 | Morita | ............ 425/130 |
| 5,094,602 A | * | 3/1992 | Morita | ............ 425/130 |
| 5,670,184 A | * | 9/1997 | Nakamichi et al. | ......... 425/130 |
| 5,962,042 A | * | 10/1999 | Konno | ............ 425/542 |
| 6,074,577 A | * | 6/2000 | Katsura et al. | ............ 264/1.25 |
| 6,296,789 B1 | * | 10/2001 | Go et al. | ............ 264/1.25 |
| 6,719,927 B1 | * | 4/2004 | Sakurai et al. | ............ 264/1.25 |
| 6,921,503 B1 | * | 7/2005 | Sherwood | ............ 264/46.4 |

FOREIGN PATENT DOCUMENTS

JP    11-31035 A    2/1999

* cited by examiner

*Primary Examiner*—Ellen E. Kim
(74) *Attorney, Agent, or Firm*—Sughrue Mion, PLLC

(57) ABSTRACT

A cavity is defined inside an injection mold to provide a contour of a light guide body. Also provided in the injection mold is a through hole communicating with the cavity and allowing an optical fiber to be inserted in the through hole. The through hole includes a columnar space provided in at least a portion contiguous to the cavity. The columnar space has a predetermined length and a cross section similar to that of the optical fiber, and a clearance left between the columnar space and the optical fiber when the optical fiber is inserted in the through hole is 30 µm or less.

4 Claims, 14 Drawing Sheets

FIG.14
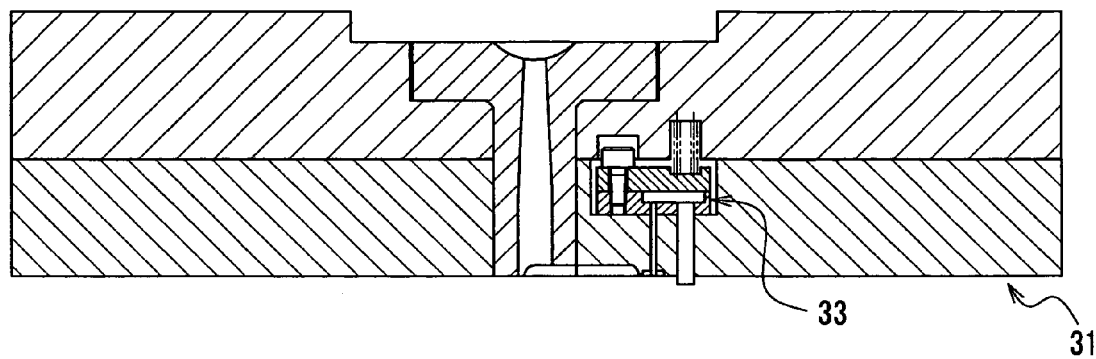
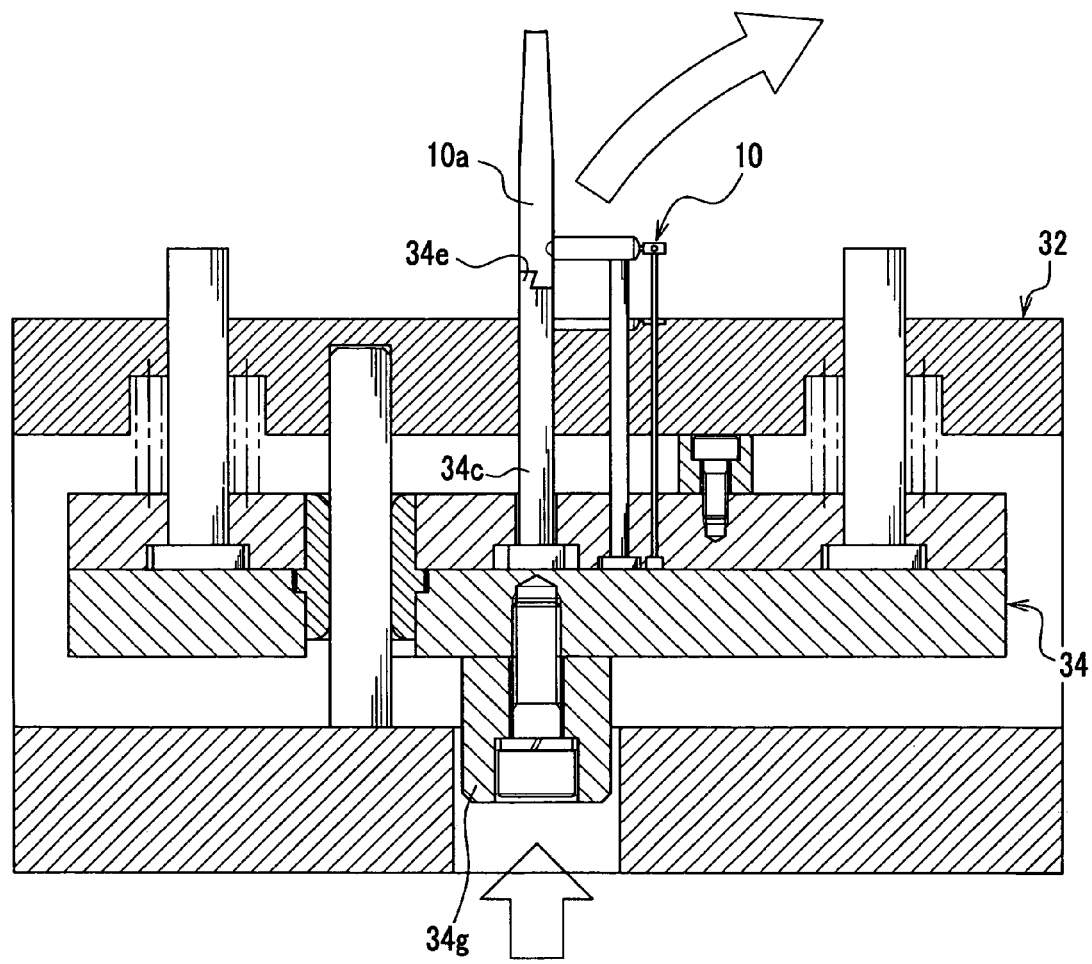

INJECTION MOLD FOR LIGHT GUIDE BODY AND APPARATUS FOR MANUFACTURING LIGHT GUIDE BODY USING SAME

CROSS-REFERENCE TO RELATED APPLIATIONS

This application claims the foreign priority benefit under Title 35, United States Code, § 119 (a)–(d), of Japanese Patent Application No. 2004-193167, filed on Jun. 30, 2004 in the Japan Patent Office, the disclosure of which is herein incorporated by reference in its entirety.

BACKGROUND OF THE INVENTION

1. Field of the Invention

The present invention relates to an injection mold for a light guide body that disperses light transmitted from one optical fiber and transmits the light to a plurality of optical fibers, and an apparatus for manufacturing a light guide body using the same.

2. Description of the Related Art

For example, an optical sheet bus for dispersing light transmitted from one optical fiber and then transmitting the light thus transmitted to a plurality of optical fibers has been recently developed as a bus for optical communications. A sheet achieved by shaping material of polymethyl methacrylate (PMMA) or the like in the form of a rectangular sheet has been known as an optical sheet bus as described above (see JP 11-31035 A).

Since the conventional optical sheet bus as described above is designed in a rectangular shape, there is a risk that light is not efficiently transmitted. Specifically, in a case where three optical fibers 120 are connected to one end face 110a of an optical sheet bus 110 as an input side and one optical fiber 120 is connected to the other end face 110b as an output side as shown in FIG. 16A, when light input from one optical fiber at the one end face 110a side travels to the other end face 110b while diffusing in the optical sheet bus 110, a part of the light enters the optical fiber 120 at the other end face 110b side, however, the other part of the light is reflected at a wall of the other end face 110b side (see the shaded area in FIG. 16B as viewed from the arrow Z of FIG. 16A) and returned to the one end face 110a. Accordingly, the light cannot be efficiently transmitted.

Furthermore, when light is transmitted from the optical fiber 120 at the other end face 110b side to the optical fiber 120 at the one end face 110a side as shown in FIG. 16C, a part of the light is likewise reflected at a wall of the one end face 110a.

The optical sheet bus as described above is used while connected to a plurality of optical fibers. In this case, the optical fibers are extremely narrow fibers and thus a method of efficiently performing the connection between the optical sheet bus and the optical fibers has been demanded.

Therefore, it would be desirable to manufacture a light guide body to efficiently perform the connection of optical fibers to an optical sheet bus.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

In one aspect of the present invention, an injection mold for a light guide body is provide, which comprises: a cavity defined inside the injection mold to provide a contour of the light guide body; and a plurality of through holes each of which communicates with the cavity and allows an optical fiber to be inserted in the through hole, wherein each through hole includes a columnar space provided in at least a portion contiguous to the cavity, the columnar space having a predetermined length and a cross section similar to that of the optical fiber and a clearance left between the columnar space and the optical fiber when the optical fiber is inserted in the through hole is 30 μm or less.

The above injection mold may preferably but not necessarily be comprised of a first mold and a second mold having a first groove and a second groove for each through hole, respectively, which first and second grooves are adapted to mate and form the through hole when the first and second molds are joined together for injection molding with the optical fiber clamped at a portion of the through hole between the first and second grooves, and at least one of opposed portions in the first and second grooves corresponding to the portion of at least one of the through holes at which the optical fiber is clamped is made of an elastic material. A modulus of elasticity of the elastic material may preferably but not necessarily be lower than that of the optical fiber. A bulk modulus of elasticity of the elastic material may preferably but not necessarily, be in a range of $0.01 \times 10^{10}$ to $0.40 \times 10^{10}$ Pa. The elastic material may preferably but not necessarily be made of a hard rubber. The first and second grooves for at least one of the through holes may preferably but not necessarily be each shaped to have a curved cross section having a curvature smaller than that of the cross section of the optical fiber. A sum of depths of the first and second grooves for at least one of the through holes may preferably but not necessarily be lesser than a diameter of the cross section of the optical fiber, the sum of the depths being determined in accordance with a modulus of elasticity of the elastic material.

A portion of at least one of the through holes at which the optical fiber is clamped may preferably but not necessarily have a cross section such that a diameter of a largest inscribed circle thereof is lesser than a diameter of the cross section of the optical fiber, and an area thereof may preferably but not necessarily be greater than an area of the cross section of the optical fiber.

The elastic material may preferably but not necessarily be a V-shaped telescopic leaf spring. At least one of the through holes may preferably but not necessarily be shaped to have a rectangular cross section.

The clearance left between the columnar space and the optical fiber when the optical fiber is inserted in the through hole may preferably but not necessarily be 20 μm or more.

The cavity may preferably but not necessarily be comprised of a main body portion, and a plurality of tapered portions corresponding to the through holes, each of the tapered portions having a thinner end contiguous to the through hole and a thicker end contiguous to the main body. A taper angle of at least one of the tapered portions may be substantially equal to an angle of divergence of light traveling through a portion of the light guide body corresponding to the main body portion of the cavity. The taper angle of at least one of the tapered portions may preferably but not necessarily be in a range of 3 to 30 degrees.

In another aspect of the present invention, an apparatus for manufacturing a light guide body is provided which comprises the injection mold as described above, and an injection device to supply a molten material into the cavity. The molten material may preferably but not necessarily be a polymethyl methacrylate with a light scatterer dispersed therein. An index of refraction of the light scatterer may preferably but not necessarily be different from that of polymethyl methacrylate.

A light guide body to which an optical fiber is connected can be efficiently manufactured by this apparatus for manufacturing a light guide body, which includes an injection device for supplying molten material into the cavity of the mold as described above.

According to the present invention, the connection between an optical fiber and a light guide body can be easily performed by insert molding. Particularly, the cross-sectional shape of at least a portion of the hole which has a predetermined length and is opened to the cavity is similar to the cross-sectional shape of the optical fiber, and the interval between the portion concerned and the optical fiber is set to 30 µm or less. Therefore, the optical fiber is prevented from being pressed, no leakage of molten resin occurs, and occurrence of flashes can be suppressed.

BRIEF DESCRIPTION OF THE DRAWINGS

The various aspects, other advantages and further features of the present invention will become more apparent by describing in detail illustrative, non-limiting embodiments thereof with reference to the accompanying drawings, in which:

FIG. 14 is a cross-sectional view showing a state where the optical sheet bus is pushed out to the outside of the mold by a movable side ejector mechanism;

DETAILED DESCRIPTION OF THE EXEMPLARY EMBODIMENTS

Figure 1:
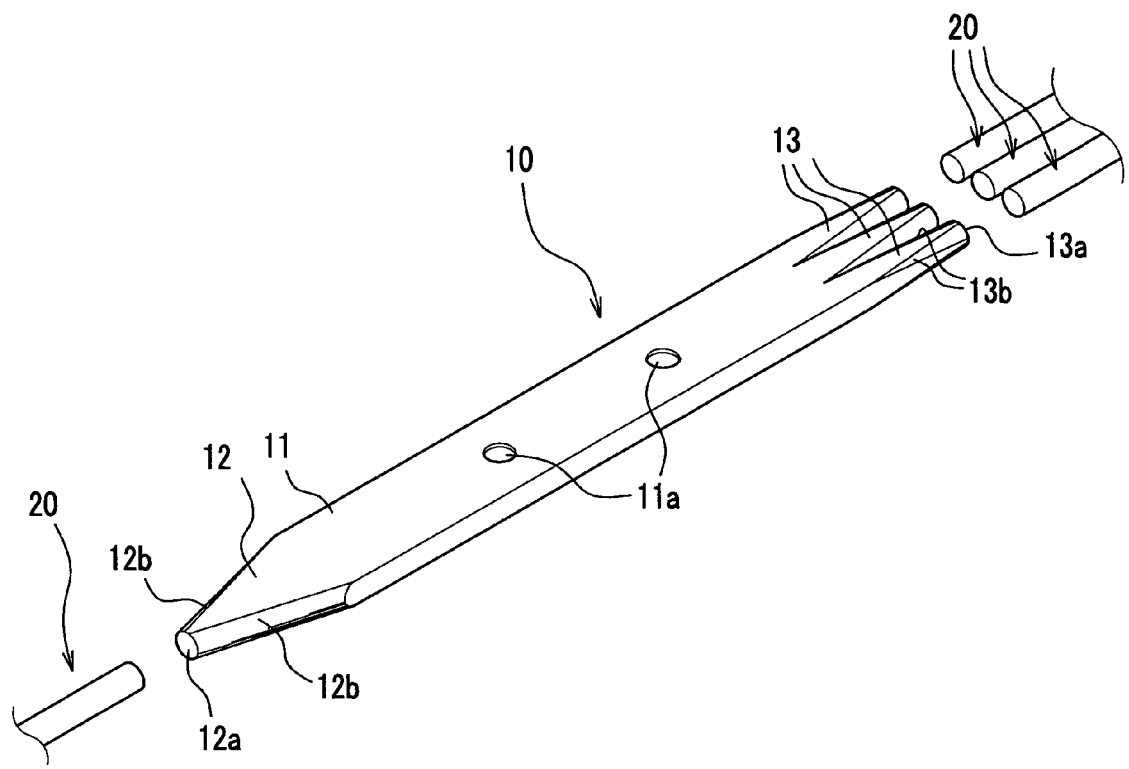
FIG. 1 is a perspective view showing an optical sheet bus according to one exemplary embodiment.
Figure 2:
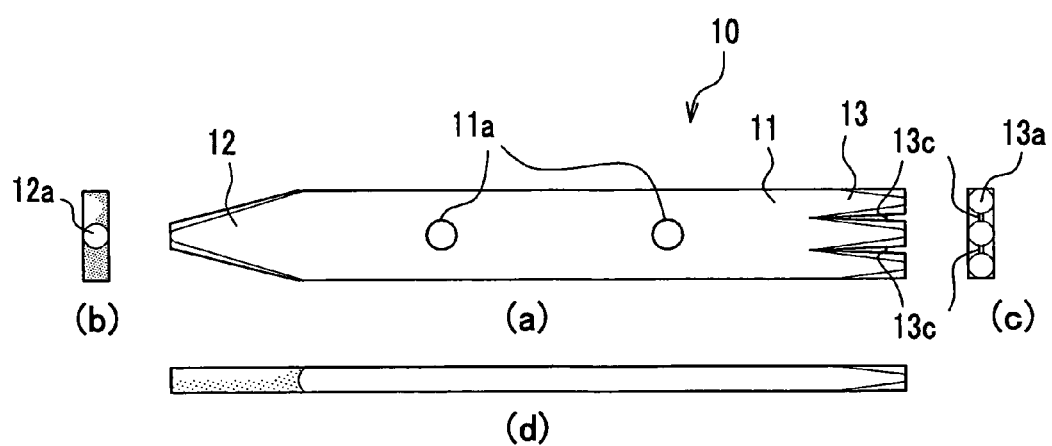
FIG. 2(a) is a plane view of the optical sheet bus, (b) is a front view of the optical sheet bus, (c) is a rear view of the optical sheet bus, (d) is a side view of the optical sheet bus.

Next, an embodiment of the present invention will be described in detail with reference to the drawings. In this embodiment, an injection mold of a light guide body and a manufacturing method thereof will be described by taking as an example a so-called optical sheet bus which is formed in a sheet-shape as a typical shape of the light guide body. FIG. 1 is a perspective view showing an optical sheet bus according to this embodiment, FIG. 2(a) is a front view showing the optical sheet bus, FIG. 2(b) is a left side view of the optical sheet bus, FIG. 2(c) is a right side view of the optical sheet bus, and FIG. 2(d) is a bottom view of the optical sheet bus.

As shown in FIG. 1, the optical sheet bus 10 is formed in a thin-plate shape, and is formed so that one optical fiber 20 is joined to one end side thereof and three optical fibers 20 are joined to the other end side thereof. In the following description, one end side of the optical sheet bus 10 will be referred to as a "front side" and the other end side will be referred to as a "rear side" for the sake of convenience.

The optical sheet bus 10 mainly comprises a rectangular main body 11, a front side tapered portion 12 which is integrally formed with the front side of the main body 11, and three rear side tapered portions 13 which are integrally formed with the rear side of the main body 11.

The main body 11 is provided with pin impressions 11a on both the surfaces thereof. These pin impressions 11a are formed through the transfer of steps occurring between ejector pins 33a and 34a of ejector mechanisms 33 and 34 provided at an injection mold 30 described later and shaping recesses 31b and 32b of a fixed mold 31 and a movable mold 32. The height of the step caused by the pin impression 11a is set to 10 μm or less. The optical sheet bus 10 is formed so that the surface roughness Ra thereof is set to 1.0 μm or less.

The front side tapered portion 12 is shaped so that the width of the main body 11 is gradually narrowed toward the front side, and the end face 12a thereof is set to have substantially the same diameter as the optical fiber 20. The angle in a plan view of the front side tapered portion 12 (the angle between two slant faces 12b) is set to be substantially equal to the diffusing angle of light from the optical fiber 20 joined to the end face 12a. That is, this front side tapered portion 12 is shaped by cutting off a portion through which light passed from the front side to a conventional rectangular optical sheet bus does not pass. It should be noted that the angle of the front side tapered portion 12 is preferably 3° to 30°.

A rear side tapered portion 13 is provided in connection with each of the three optical fibers 20 joined with the rear side of the optical sheet bus 10. The rear end portion of the main body 11 is divided into three parts, and each of these divisional parts is formed so that the width thereof is gradually reduced toward the rear side. Each of the rear side tapered portions 13 is formed so that the end face 13a thereof has substantially the same diameter as the optical fiber 20, and the angle in a plane view (the angle between two slant faces 13b) is set to be smaller than the diffusing angle of light from the optical fiber 20 joined to the end face 13a. Furthermore, each rear side tapered portion 13 is reinforced by a reinforcing portion 13c which is formed so that the neighboring rear side tapered portions 13 are linked to each other therethrough (see FIG. 2(a) and FIG. 2(c)). The angle of the rear side tapered portions 13 is preferably 3° to 30°.

For example, polymethyl methacrylate (PMMA) is used as the material of the optical sheet bus 10. However, a light-scattering body (light scatterer) may be dispersed in the PMMA optical sheet bus to induce a light scattering effect as described in JP 10-123350 A, for example. The scattering effect by such a light-scattering body enables reduction in the length of light in the traveling direction (direction shown in FIG. 15A and FIG. 15B) in the optical sheet bus 10. Polystyrene (PS) having a refractive index different from that of PMMA, or the like, is used as the material of such a light-scattering body.

Figure 3:
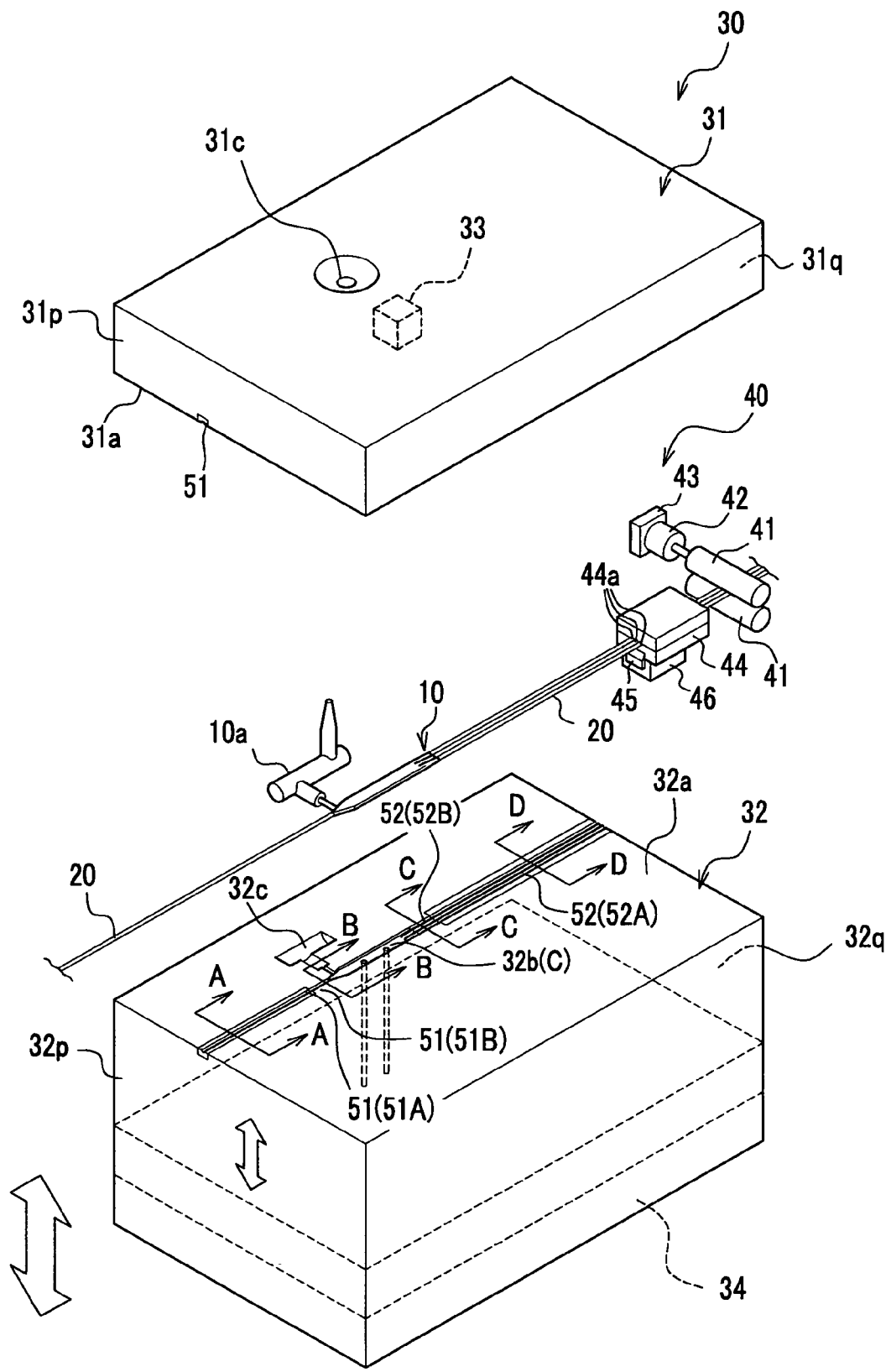
FIG. 3 is a perspective view showing an injection mold for forming the optical sheet bus and an optical fiber supply device.

Next, an injection mold 30 and an optical fiber supply device 40 for manufacturing the optical sheet bus 10 described above will be described with reference to FIG. 3. FIG. 3 is a perspective view showing an injection mold and an optical fiber supply device for forming an optical sheet bus.

As shown in FIG. 3, the injection mold 30 comprises a fixed mold 31, a movable mold 32 (first mold) constructed so as to be freely movable relative to the fixed mold 31, a fixed side ejector mechanism 33 provided in the fixed mold 31 (second mold), and a movable side ejector mechanism 34 provided in the movable mold 32.

Figure 7:
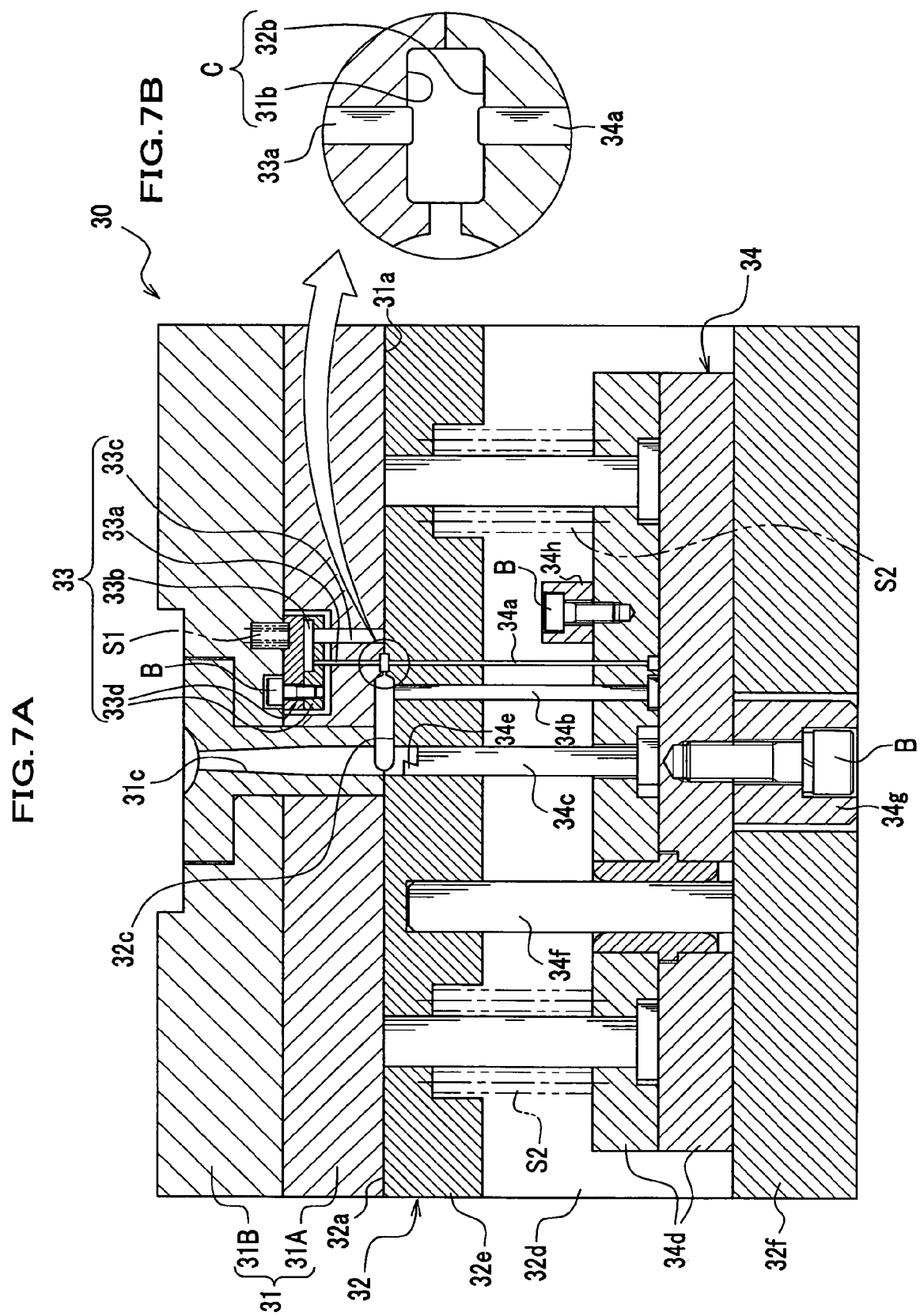
FIG. 7(a) is a cross-sectional view showing the inside of an injection mold.
FIG. 7(b) is an enlarged cross-sectional view showing the main part of the details of the shaping recess.

Shaping recesses 31b and 32b (the combination of these portions will be referred to as "cavity C," see FIG. 7 for the shaping recess 31b) which template the shape of an upper half (one part) or lower half (the other part) of the optical sheet bus 10 are formed on mating surfaces 31a and 32a of the fixed mold 31 and the movable mold 32. A sprue 31c for guiding molten resin (molten material) injected from the injecting device to a runner formed portion 32c is formed on the fixed mold 31, and the runner formed portion 32c for connecting the shaping recesses 31b and 32b to the sprue 31c (see FIG. 7 for details of the sprue 31c) is formed on the mating surfaces 31a and 32a.

Furthermore, one groove 51 and three grooves 52 for inserting optical fibers 20 are formed on the mating surfaces 31a and 32a. The groove 51 extends forward from the front end of the cavity C, that is, the portion corresponding to the end face 12a of the tapered portion 12 to the front side surface 31p of the fixed mold 31 and the front side surface 32p of the movable mold 32, and is open to the outside.

Likewise, the groove 52 extends backward from the rear end of the cavity C, that is, the portion corresponding to the end face 13a of the rear side tapered portion 13 to the rear side surface 31q of the fixed mold 31 and the rear side surface 32q of the movable mold 32.

Among these grooves 51 and 52, for example, the grooves 51 and 52 at the fixed mold 31 side are first grooves, and the grooves 51 and 52 at the movable mold 32 are second grooves.

FIGS. 4A through 4D are cross-sectional views of insertion holes (through holes) for optical fibers; FIGS. 4A, 4B, 4C and 4D are cross-sectional views of lines A—A, B—B, C—C and D—D of FIG. 3, respectively. The groove 51 and the groove 52 constitute holes into which the optical fibers 20 are inserted when the fixed mold 31 and the movable mold 32 are closed (hereinafter referred to as "insertion holes"). An insertion hole 51A is formed so that the diameter of the internally-contacting maximum circle is slightly smaller than the diameter of the optical fibers 20, whereby the optical fibers 20 can be pinched when the injection mold 30 is closed.

Figure 4A:
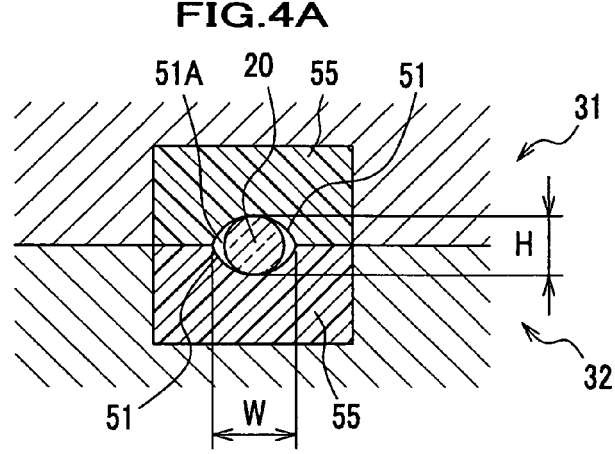
FIG. 4A is a cross-sectional view taken along line A—A of FIG. 3, showing an insertion hole of the optical fiber.

As shown in FIG. 4A, the grooves 51 in the A—A cross-section are formed at portions where respective elastic members 55 are engaged as inserts in the fixed mold 31 and the movable mold 32. The elastic members 55 are formed of, for example, a hard rubber. The elastic members 55 are provided in a predetermined range from the cavity C in the grooves 51 formed in the mating surfaces 31a and 32a, for example, from the portion about 10 mm spaced from the cavity C to the front ends of the mating surfaces 31a and 32a.

Each groove 51 has a profile having a curvature smaller than the curvature of the peripheral surface of the optical fiber 20. The height H of the insertion hole 51A which corresponds to the sum of the total depth of the grooves 51 of the fixed mold 31 and the movable mold 32 is set to be slightly smaller than the diameter of the optical fibers 20. Therefore, the insertion hole 51A has a cross-sectional shape substantially like an "eye." The height H of the insertion hole 51A is properly determined in accordance with the degree of elasticity (modulus of elasticity) of the elastic members 55 so as to pinch the optical fiber 20 with proper force.

The width W of the insertion hole 51A is formed to be larger than the diameter of the optical fiber 20, and the cross-sectional area of the insertion hole 51A is set to be larger than the cross-sectional area of the optical fiber 20.

As described above, the height H of the insertion hole 51A is slightly smaller than the diameter of the optical fiber 20, and thus the optical fiber 20 can be pinched and fixed by the elastic members 55 when the injection mold 30 is closed. Since the elastic members 55 have proper elasticity, the optical fibers 20 are not damaged, and also no excessive stress is applied to the optical fibers 20. Furthermore, the cross-sectional area of the insertion holes 51A is larger than the cross-sectional area of the optical fibers 20. Therefore, when the injection mold 30 is closed, the optical fibers 20 are not pressed, and thus the quality of the optical fibers 20 can be kept excellent. In addition, the closing of the mold can be reliably performed.

Figure 5A:
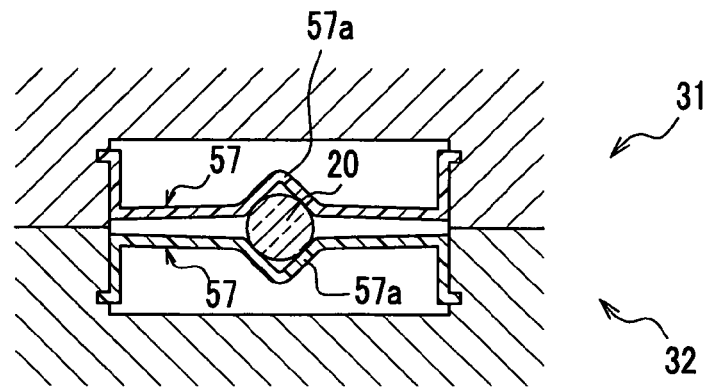
FIG. 5A shows a modified example of the insertion hole, which is constructed by metal plates.
Figure 5B:
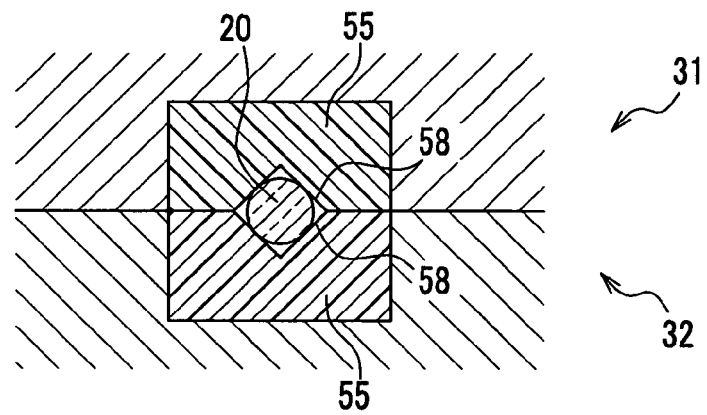
FIG. 5B shows another modified example of the insertion hole, in which a V-shaped groove is formed in an elastic member.

The material of the elastic members 55 is not limited to a specific one insofar as it has proper elasticity so that it does not damage the optical fibers 20 and also applies no excessive stress to the optical fibers 20. For example, insert members 57 each of which has a V-shaped groove 57a formed by bending a metal plate member as shown in FIG. 5A may be used. By forming the elastic members 55 of metal as described above, degradation by heat or friction can be prevented. Furthermore, the cross-sectional shape of the insert hole 51A is not limited to an eye shape, and it may be formed in a rectangular shape by forming grooves 58 each having a V-shaped section in the elastic members 55. With this form, the friction force imposed on the optical fibers 20 can be increased, so that allowance for pinching the optical fibers 20 can be formed to be small, and thus the load imposed on the optical fibers 20 can be reduced.

Figure 4B:
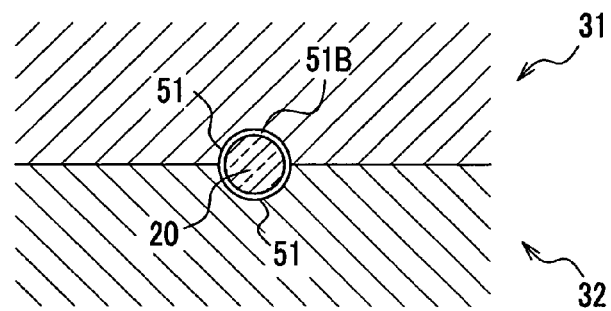
FIG. 4B is a cross-sectional view taken along line B—B of FIG. 3, showing an insertion hole of the optical fiber.

As shown in FIG. 4B, the B-B cross-section of FIG. 3, that is, the cross-sectional shape of a portion of the insertion hole 51B nearest to the cavity C (the portion contiguous to the cavity C) is formed in a circular shape which is slightly larger in diameter than the optical fiber 20. The diameter of the insertion hole 51B is larger than the diameter of the optical fiber by 0 to 60 μm. That is, it is set so that the interval between the insertion hole 51B and the optical fiber 20 is not more than 30 μm. In consideration of ease in the insertion of the optical fiber 20 into the insertion hole 51B, it is desired that the interval between the optical fiber 20 and the insertion hole 51B is set to about 20 to 30 μm.

As described above, when only a slight gap is provided between the insertion hole 51B and the optical fiber 20, no molten resin invades into the gap. That is, the optical fiber 20 is not pressed by the mold, and also leakage of molten resin or occurrence of flashes can be suppressed.

Figure 6:
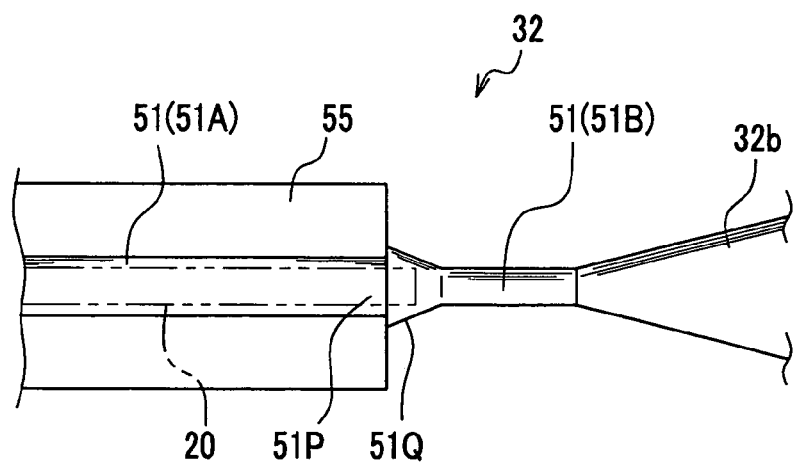
FIG. 6 is an enlarged plane view showing a joint portion between a cavity and a groove in the movable mold of FIG. 3.

FIG. 6 is an enlarged plane view showing the joint portion between the cavity C and the groove 51 in the movable mold 32 of FIG. 3. A funnel-shaped guide portion 51Q achieved by spreading the inlet port 51P of the insertion hole 51B is formed at the joint portion between the insertion hole 51A and the insertion hole 51B. The cross-sectional profile of the inlet port 51P is set to be larger than the cross-sectional profile of the insertion hole 51A, whereby the optical fiber 20 is smoothly inserted into the insertion hole 51B. When the outlet port of the insertion hole 51A at the elastic member 55 side is gradually narrowed in place of the spreading of the inlet port 51P of the insertion hole 51B, the cross-sectional profile of the outlet port is set to be smaller than the cross-sectional profile of the insertion hole 51B.

Figure 4C:
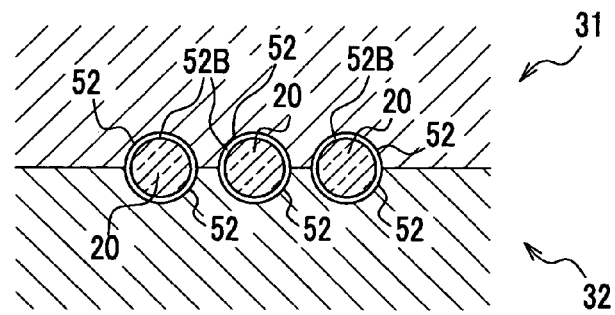
FIG. 4C is a cross-sectional view taken along line C—C of FIG. 3, showing insertion holes of the optical fibers.

As shown in FIG. 4C, three insertion holes 52B are formed in conformity with the number of optical fibers 20 to be inserted in the C—C cross-section of FIG. 3. Each insertion hole 52B is the same as the B—B cross-section of FIG. 3, and thus detailed description thereof is omitted.

Figure 4D:
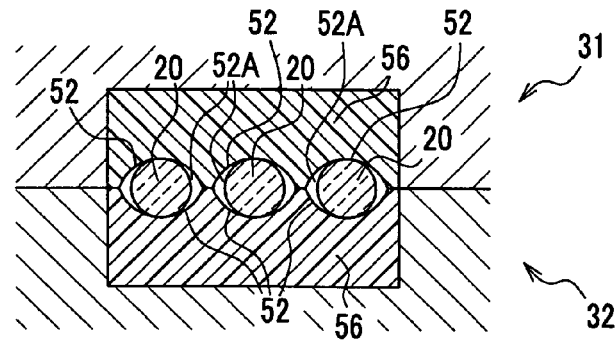
FIG. 4D is a cross-sectional view taken along line C—C of FIG. 3, showing insertion holes of the optical fibers.

In the D—D cross-section of FIG. 4D, elastic members 56 similar to the elastic members 55 are provided as inserts, and three insertion holes 52A are formed in the elastic members 56 in conformity with the number of the optical fibers 20 to be inserted. Each insertion hole 52A is the same as the insertion hole 52A in the A—A cross-section and thus detailed description is omitted.

As shown in FIG. 7A, the fixed side ejector mechanism 33 mainly comprises two ejector pins 33a (only the one at the front side is shown), synchronizing pins 33c integrally coupled to the ejector pins 33a through a mounting plate 33b, two retainer plates 33d fastened by a bolt B while the mounting plate 33b is sandwiched therebetween in the vertical direction, and a spring S1 for urging the retainer plates 33d to the movable mold 32 side at all times.

Figure 8:
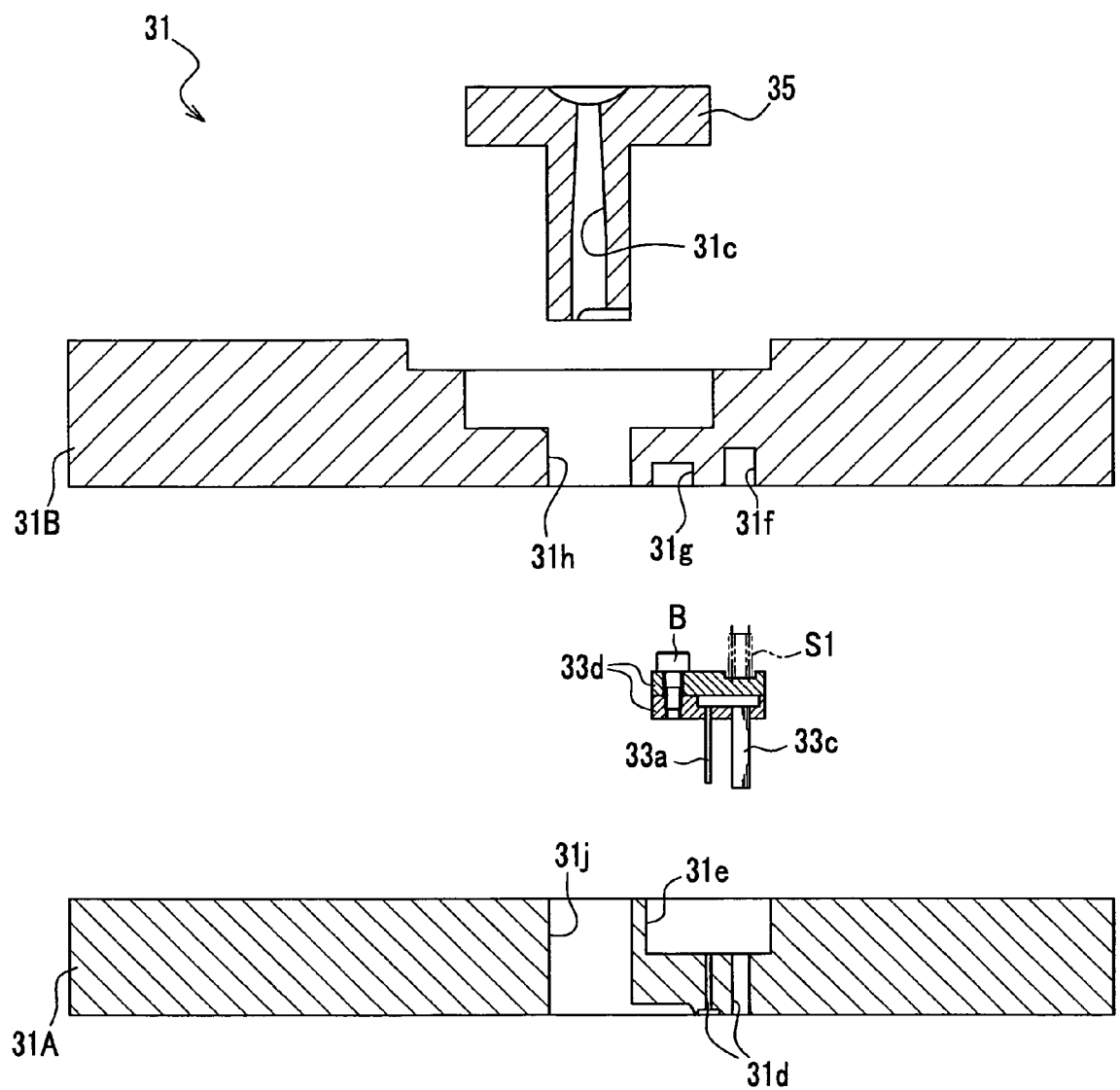
FIG. 8 is an exploded cross-sectional view showing the details of a fixed side ejector mechanism.

As shown in FIG. 8, the fixed mold 31 is divided into upper and lower parts. The lower side fixed mold 31A constituting the lower half portion of the fixed mold 31 is provided with engagement pores 31d in which the ejector pin 33a and the synchronizing pin 33c are freely slidably fitted, and also with an accommodating recess portion 31e in which the two retainer plates 33d fastened to each other by the bolt B are freely slidably fitted. The upper side fixed mold 31B constituting the upper half portion of the fixed mold 31 is provided with a retainer recess 31f for holding the spring S1 while the spring S1 is contracted, and a relief hole 31g in which the head portion of the bolt B is accommodated. The stroke amount of the retainer plates 33d is determined by the bottom surface of the accommodating recess portion 31e of the lower side fixed mold 31A and the lower surface of the upper side fixed mold 31B. Furthermore, the upper side fixed mold 31B and the lower side fixed mold 31A are provided with fitting pores 31h and 31j for attaching a sprue bush 35 having a sprue 31c formed therein.

Figure 12:
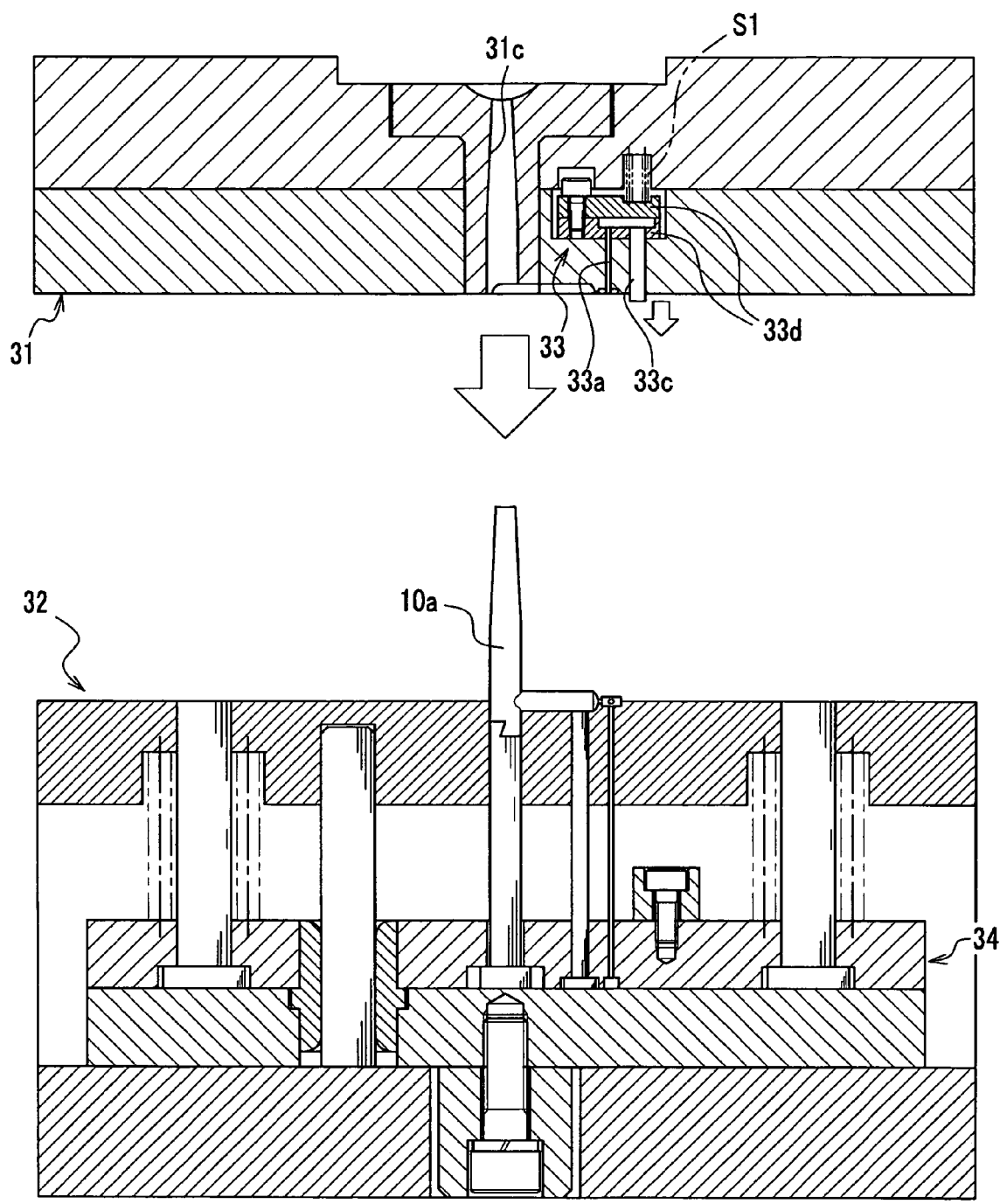
FIG. 12 is a cross-sectional view showing a state where the movable mold is distant from the fixed mold after the optical sheet bus is formed.

In the fixed side ejector mechanism 33 thus constructed, the retainer plates 33d are downwardly pressed by the spring S1 under the state that the movable mold 32 is spaced from the fixed mold 31 as shown in FIG. 12, whereby the ejector pin 33a and the synchronizing pin 33c are pushed downwardly by a predetermined amount. As shown in FIG. 7(a) and FIG. 7(b), under the state that the fixed mold 31 and the movable mold 32 are mated with each other, the synchronizing pin 33c is pressed to the mating surface 32a of the movable mold 32 so as to be located on the same plane as the mating surface 31a while the ejector pin 33a is moved so as to be located on approximately the same plane as the formed face of the shaping recess 31b. That is, the ejector pin 33a and the synchronizing pin 33c are designed so as to be freely ejected from the formed face and the mating surface 31a of the shaping recess 31b of the fixed mold 31, respectively.

As shown in FIG. 7(a), a movable side ejector mechanism 34 has two ejector pins 34a (only the one at the front side is shown), two pushing pins 34b and 34c for pushing a runner 10a (see FIG. 3), and two retainer plates 34d for integrally retaining these ejector pins 34a and pushing pins 34b and 34c. An engagement claw portion 34e which draws the runner 10a thus formed in connection with the movement of the movable mold 32 is formed at the tip of the pushing pin 34c provided at the lower side of the sprue 31c extending in the vertical direction. Specifically, the engagement claw portion 34e is formed to be hooked to the runner 10a by forming an upper step surface portion constituting a step in an overhung form.

The movable side ejector mechanism 34 has a guide bar 34f fixed to the movable mold 32 to freely and slidably support the retainer plates 34d, and a spring S2 for urging the retainer plates 34d so that the retainer plates 34d are separated from the fixed mold 31 side at all times. A protrusion portion 34g to be pressed by a pressing device (not shown) is fastened to substantially the center portion of the lower-side retainer plate 34d of the two retainer plates 34d by the bolt B, and a stopper 34h for regulating the upward movement of the retainer plates 34d by a predetermined amount or more is fastened to a proper place of the upper retainer plate 34d by the bolt B.

The movable mold 32 is provided with a die plate 32e and a movable side mounting plate 32f which are linked to each other by a spacer block 32*d* shown at the back side of the figure, and the protrusion amounts of the ejector pin 34*a* and the pushing pins 34*b* and 34*c* are determined by the die plate 32*e*, the movable side mounting plate 32*f*, the lower surface of the retainer plate 34*d* and the upper surface of the stopper 34*h*.

Figure 10A:
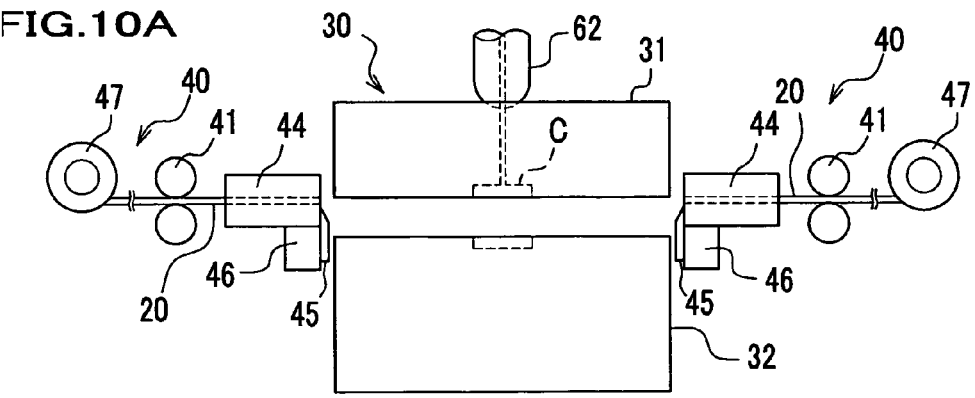
FIG. 10A is a diagram showing a pre-operation state in one step of the process of the manufacturing method according to one exemplary embodiment of the present invention.

As shown in FIG. 3, an optical fiber supply device 40 comprises a roller 41 as a feed-out device for feeding an optical fiber 20 while pinching the same, a motor 42 for rotationally driving the roller 41, a rotary encoder 43 for detecting the rotational angle of the motor 42, a guide 44, a blade 45, a blade driving device 46, and a supply reel 47 (see FIG. 10A).

The guide 44 is provided in proximity to the insertion hole 52A when the injection mold 30 is closed, and three guide holes 44*a* are formed so that three optical fibers 20 are smoothly passed through the guide holes 44*a*. The guide 44 is disposed so that the guide hole 44*a* faces the insertion hole 52A. That is, the three optical fibers 20 fed out from the roller 41 are guided to the insertion holes 52A by the guide 44.

In FIG. 3 and FIG. 10A, a slight gap is provided between the guide 44 and the insertion hole 52A and between the guide 44 and the roller 41. The gap is set to be as small as possible, for example, it is set to 20 mm or less, preferably to 10 mm or less, whereby slackening of the optical fibers 20 is suppressed and the optical fibers 20 having a fixed length can be reliably inserted into the insertion holes 52A.

The blade 45 is disposed at the outlet side of the guide 44, that is, at the side surface of the injection mold 30 side, and is provided to be slidable in the vertical direction by a guide mechanism (not shown). It is driven in the vertical direction by the blade driving device 46 constructed by an air cylinder or the like.

Although not shown in FIG. 3, the optical fiber supply device 40 is also disposed so as to face the insertion holes 51A.

Figure 9:
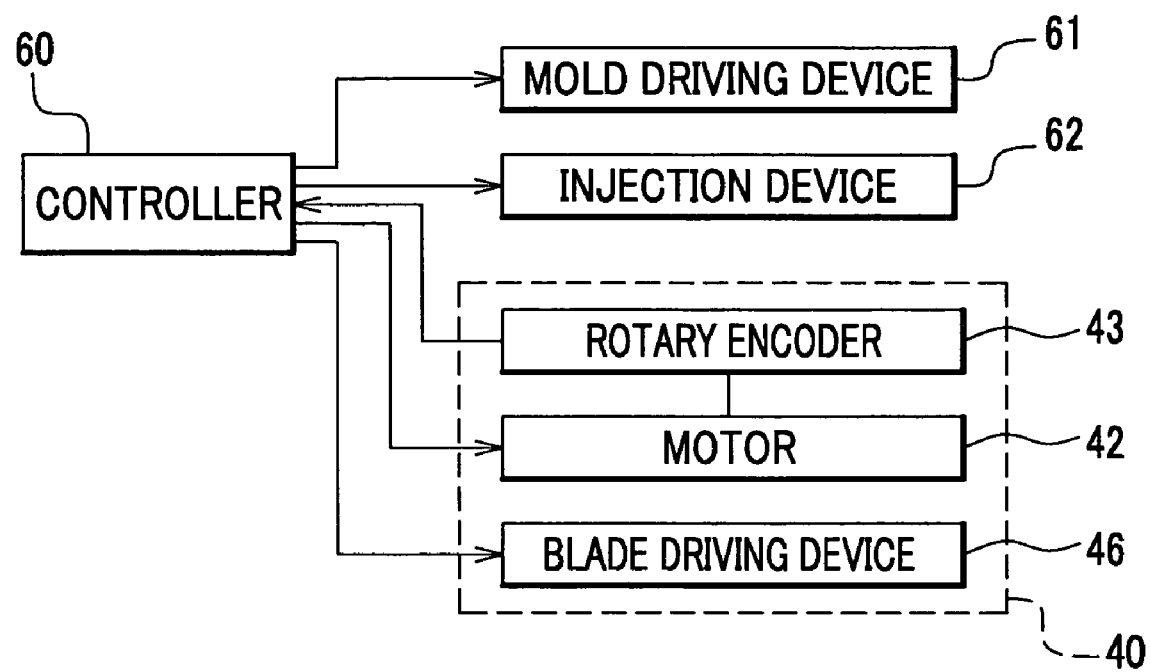
FIG. 9 is a block diagram showing a manufacturing apparatus of the optical sheet bus.

As shown in the block diagram of FIG. 9, a controller 60 controls the operation of the mold driving device 61, the injection device 62, the motor 42 and the blade driving device 46 on the basis of the outputs of a pre-installed operation program and the rotary encoder 43.

The specific control will be described in the method of manufacturing the light guide body.

Figure 10B:
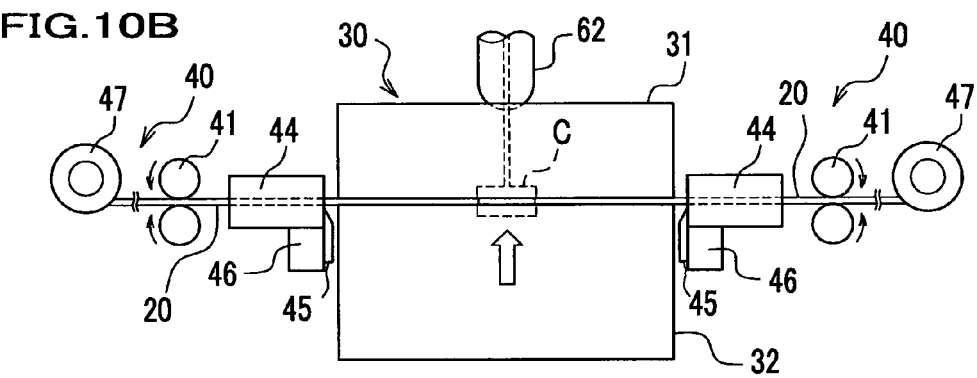
FIG. 10B is a diagram showing a state where the injection mold is half closed and optical fibers are inserted, in one step of the process of the manufacturing method according to one exemplary embodiment of the present invention.
Figure 10C:
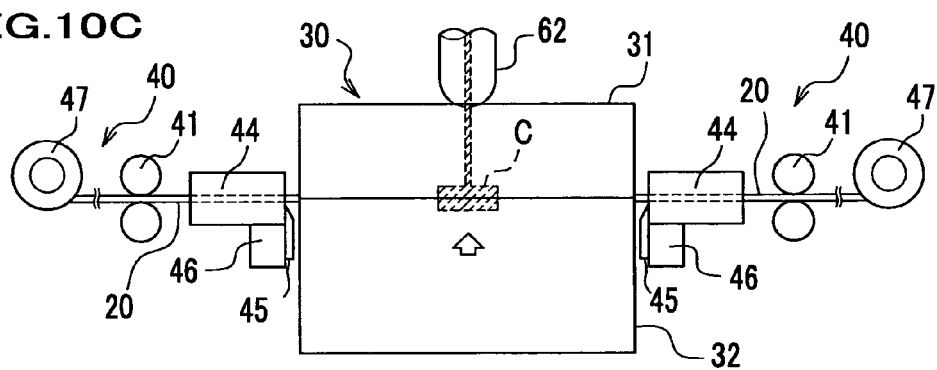
FIG. 10C is a diagram showing a state where the mold is closed and molten resin is injected, in one step of the process of the manufacturing method according to one exemplary embodiment of the present invention.
Figure 10D:
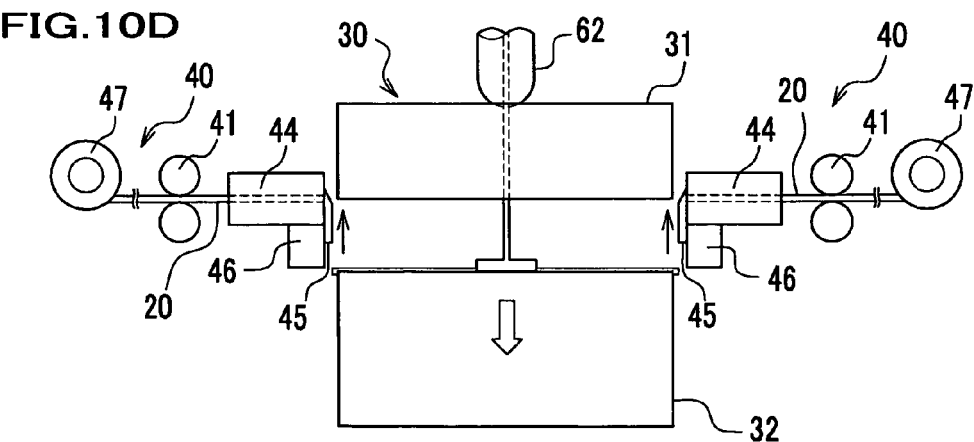
FIG. 10D is a diagram showing a state where the mold is opened.

Next, the method of manufacturing the optical sheet bus 10 based on the injection mold 30 according to this embodiment will be described. FIGS. 10A through 10D show the process of the manufacturing method of this embodiment, wherein FIG. 10A shows a state before the operation, FIG. 10B shows a state where the injection mold is half closed and an optical fiber is inserted, FIG. 10C shows a state where the mold is closed and molten resin is injected, and FIG. 10D shows a state where the mold is opened.

As shown in FIG. 10A, the controller 60 controls the mold driving device 61 to approach the movable mold 32 to the fixed mold 31 from the state that the injection mold 30 is opened and the blade 45 is descended, and stops the movable mold 32 at the position at which a slight gap remains between the mating surfaces 31*a* and 32*a* (a half closed state, see FIG. 10B).

Figure 11:
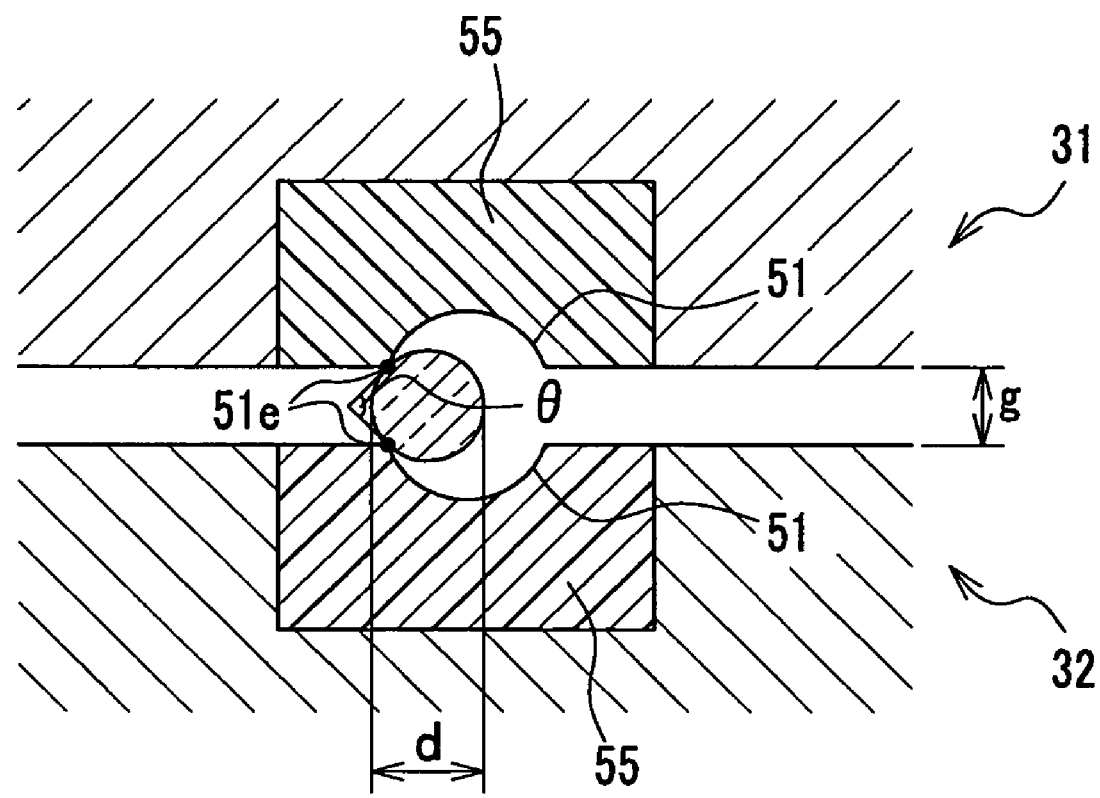
FIG. 11 is a diagram showing a gap when the injection mold is half closed.

The dimension of the gap g (see FIG. 11) at this time is set to be smaller than the diameter of the optical fiber 20, and thus the optical fiber 20 can be reliably inserted into the groove 51 so that the optical fiber 20 is not pinched between the mating surfaces 31*a* and 32*a*. The gap g is preferably set so that the distance between the edge portions 51*e* of the grooves 51 is equal to 0.7 times or less of the diameter d of the optical fiber 20. Accordingly, the pinching angle θ of the optical fiber 20 by the edge portions 51*e* is an obtuse angle and the optical fiber 20 is smoothly inserted without being hooked to the edge portions 51*e*. This is also applied to the groove 52.

After stopping the movable mold 32, the controller 60 rotates the motor 42 while monitoring the feeding amount of the optical fiber 20 by the rotary encoder 43 to insert the optical fibers 20 into the insertion holes 51A, 51B, 52A, and 52B. The optical fibers 20 are inserted by only a predetermined insertion length, whereby the tips of the optical fibers 20 are located at the inlet of the cavity C (the boundary between the cavity C and the insertion holes 51B and 52B). At this time, the optical fibers 20 are smoothly guided to the insertion holes 51A, 51B, 52A, and 52B by the guide 44.

Thereafter, as shown in FIG. 10C, the controller 60 controls the mold driving device 61 to further approach the movable mold 32 to the fixed mold 31 and perfectly close the injection mold 30. At this time, the grooves 51 and 52 formed in the elastic members 55 pinch the optical fibers 20 to fix the optical fibers 20, and no excessive stress is applied to the optical fibers 20.

Figure 13A:
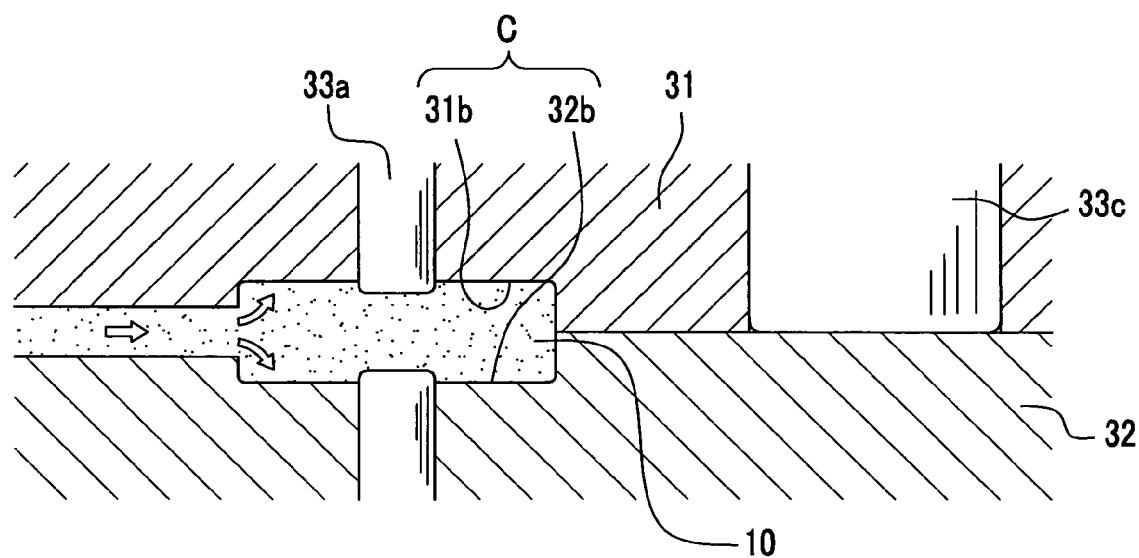
FIG. 13A is a cross-sectional view showing a state where material is injected into the inner space of the mold.

Subsequently, the controller 60 injects the molten resin to the sprue 31*c* by the injection device 62. Accordingly, the molten resin is passed through the sprue 31*c* and the runner formed portion 32*c*, and supplied into the cavity formed by the shaping recesses 31*b* and 32*b* as shown in FIG. 13A.

After the material is supplied into the shaping recesses 31*b* and 32*b*, the injection mold 30 is cooled, whereby the resin is hardened to form the optical sheet bus 10 and simultaneously the optical sheet bus 10 and the optical fibers 20 adhere to each other.

Figure 13B:
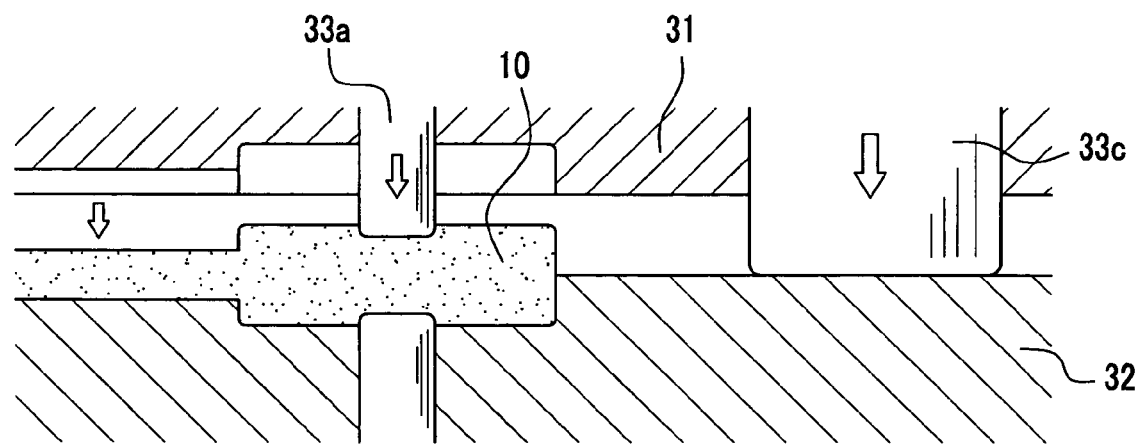
FIG. 13B is a cross-sectional view showing a state where the optical sheet bus thus completed is approached to the movable mold side by an ejector pin when the movable mold is separated from the fixed mold.

Subsequently, as shown in FIG. 10D, the controller 60 controls the blade driving device 46 to slide the blade 45 upward, and cut the optical fibers 20 between the blade driving device 46 and the guides 44. The controller 60 controls the mold driving device 61 to separate the movable mold 32 from the fixed mold 31 in order to take out the optical sheet bus 10 from the injection mold 30. Accordingly, as shown in FIG. 13B, the synchronizing pin 33*c* supported by the movable mold 32 is downwardly moved together with the movable mold 32, so that the ejector pin 33*a* is moved integrally with the synchronizing pin 33*c*, and thus the optical sheet bus 10 is ejected to the movable mold 32 side. That is, the optical sheet bus 10 is moved together with the movable mold 32 while the optical sheet bus 10 is held in the movable mold 32. Therefore, when the mold is opened, the optical sheet bus 10 can be reliably approached to the movable mold 32 side.

When the mold is opened, in addition to the ejecting operation of the optical sheet bus 10 by the ejector pin 33*a*, the runner 10*a* (see FIG. 3) is hooked by the engagement claw portion 34*e* formed in the pushing pin 34*c* at the movable mold 32 side shown in FIG. 7A and moved together with the movable mold 32, so that the optical sheet bus 10 with the runner 10*a* is approached to the movable mold 32 in a balanced manner.

As shown in FIG. 12, when the protrusion portion 34*g* is pushed up by the press device (not shown) as shown in FIG. 14 after the movable mold 32 is downwardly moved until the upper end of the runner 10*a* (specifically, a portion formed of the sprue 31*c*) is out of the fixed mold 31, the optical sheet bus 10 and the runner 10*a* are ejected from the movable mold 32 to the outside. The optical sheet bus 10 and the runner 10*a* thus pushed out can be taken out along the slant surface of the engagement claw portion 34*e* of the pushing pin 34*c* by a robot hand (not shown) or the like.

Subsequently, the surface finishing process of the optical sheet bus 10 taken out from the inside of the injection mold 30 as described above will be described.

As shown in FIG. 3, the runner 10a is formed integrally with the front side tapered portion 12 in the optical sheet bus 10 taken out from the injection mold 30, and thus a work of cutting out the runner 10a from the optical sheet bus 10 by a nipper or the like is first carried out. In this work, the portion remaining at the optical sheet bus 10 side is scraped off by a cutting work by a cutter or a grinding work by a grind stone until it is located on substantially the same plane as the slant surface 12b of the front side tapered portion 12. After the cutting work is carried out as described above, the portion thus cut out is subjected to a lapping (free grinding particles) so that the step of the cut-out portion is equal to 10 μm or less and the surface roughness Ra is equal to 1.0 μm or less.

Furthermore, likewise, the pin impressions 11a formed on both surfaces of the optical sheet bus 10 shown in FIG. 1 are formed so that the steps thereof are equal to 10 μm or less and the surface roughness Ra thereof is equal to 1.0 μm or less. The other portion (for example, the slant surface 13b of the rear side tapered portion 13, etc.) is formed so that the surface roughness Ra thereof is set to 1.0 μm or less since the surface of the cavity C of the injection mold 30 is made smooth.

Next, the action of the optical sheet bus 10 formed by the above method will be described.

Figure 15A:
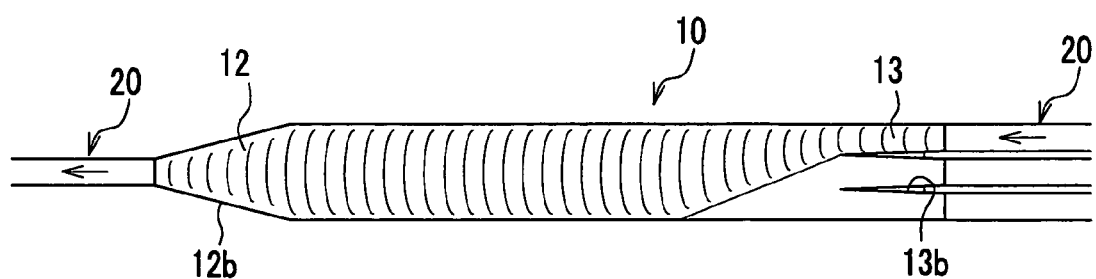
FIG. 15A is a cross-sectional view showing a state where light travels when the light is irradiated from the rear side tapered portion of the optical sheet bus.

As shown in FIG. 15A, when light is transmitted into the optical sheet bus 10 from one of the three optical fibers 20 provided at the rear side of the optical sheet bus 10, the light travels to the front side while diffusing in the optical sheet bus. When this light reaches the inside of the front side tapered portion 12, a part of the light which is apt to diffuse is properly reflected by the slant surface 12b of the front side tapered portion 12, and collected to the optical fiber 20 side at the front side, so that the amount of the light transmitted into the optical fibers 20 is increased.

Figure 15B:
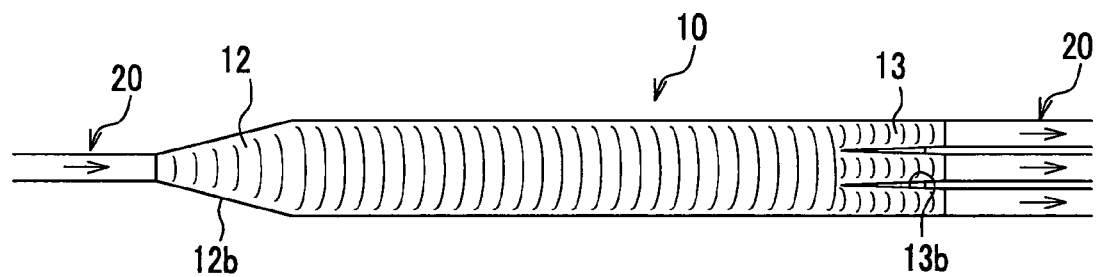
FIG. 15B is a cross-sectional view showing a state where light travels when the light is irradiated from the front side tapered portion of the optical sheet bus.
Figure 16A:
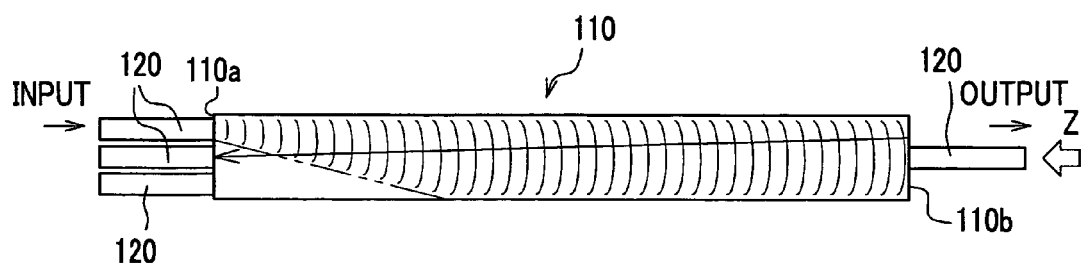
FIG. 16A is a plan view showing a case where light is passed from one optical fiber of a plurality of optical fibers to the other optical fiber side in a conventional optical sheet bus.
Figure 16B:
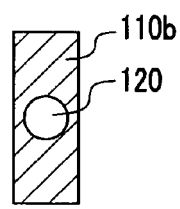
FIG. 16B is a view from an arrow Z of FIG. 16A.
Figure 16C:
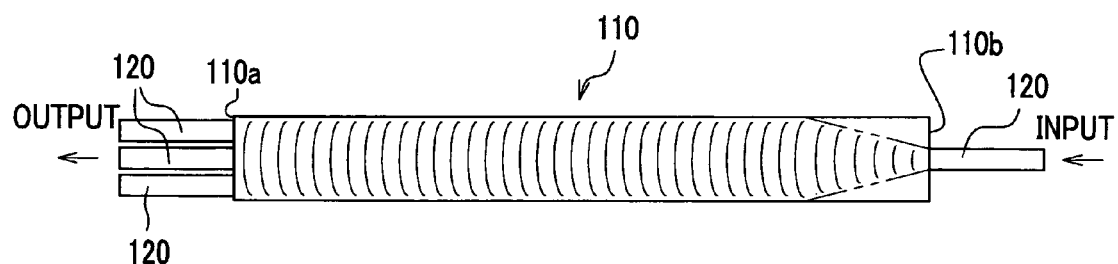
FIG. 16C is a plan view showing a case where light is transmitted to the conventional optical sheet bus in the opposite direction to that of FIG. 16A.

Furthermore, as shown in FIG. 15B, when light is transmitted into the optical sheet bus 10 from one optical fiber 20 provided at the front side of the optical sheet bus 10, the light travels to the rear side while diffusing along the slant surface 12b of the front side tapered portion 12. When this light reaches the inside of the three rear side tapered portions 13, a part of the light which is diffused by the slant surface 13b of each rear side tapered portion 13 is properly reflected and collected to each optical fiber 20 side at the rear side, so that the amount of light transmitted into each optical fiber 20 is increased.

As described above, this embodiment can achieve the following effect.

When the optical sheet bus 10 is formed, the optical fibers are inserted into the injection mold 30, and these are integrated with one another by injection molding, so that the connection between the light fibers and the light guide member can be efficiently performed. The connection between the optical fibers 20 and the optical sheet bus 10 can be reliably performed, and the signal transmission performance can be enhanced. The cross-sectional shape of at least the insertion holes 51B and 52B which have a predetermined length and are open to the cavity C among the insertion holes 51A, 51B, 52A, and 52B is similar to the cross-sectional shape of the optical fibers 20, and the gap between the insertion holes 51B and 52B and the optical fiber 20 is set to 30 μm or less. Therefore, the leakage of the molten resin or occurrence of flashes can be suppressed without pressing the optical fibers 20 at the portion concerned.

Furthermore, the optical fibers 20 are inserted into the insert holes under the state that one mold and the other mold of the injection mold are stopped with a slight gap remaining therebetween before they are closed. Therefore, the optical fibers 20 are inserted into the insertion holes 51A, 51B, 52A, and 52B which are larger than the optical fibers, so that the insert work can be easily and reliably performed.

The embodiment of the present invention has been described above. However, the present invention is not limited to the above embodiment, and it is a matter of course that the above embodiment may be properly modified. For example, the light guide body is not limited to a sheet-formed one, and it may be formed to have a shape approximating a rectangular or spherical shape and have some degree of thickness. Furthermore, the insertion holes 51B and 52B are not necessarily located at the parting line.

What is claimed is:

1. An injection mold for a light guide body, comprising:
a cavity defined inside the injection mold to provide a contour of the light guide body; and
a plurality of through holes each of which communicates with the cavity and allows an optical fiber to be inserted in the through hole, wherein each through hole includes a columnar space provided in at least a portion contiguous to the cavity, the columnar space having a predetermined length and a cross section similar to that of the optical fiber and a clearance left between the columnar space and the optical fiber when the optical fiber is inserted in the through hole is 30 μm or less,
wherein the cavity is comprised of a main body portion, and a plurality of tapered portions corresponding to the through holes, each of the tapered portions having a thinner end contiguous to the through hole and a thicker end contiguous to the main body, wherein a taper angle of at least one of the tapered portions is substantially equal to an angle of divergence of light traveling through a portion of the light guide body corresponding to the main body portion of the cavity.

2. An injection mold according to claim 1, wherein the taper angle of at least one of the tapered portions is in a range of 3 to 30 degrees.

3. An apparatus for manufacturing a light guide body, comprising:
an injection mold according to claim 1; and
an injection device to supply a polymethyl methacrylate with a light scatterer dispersed therein into the cavity.

4. An apparatus for manufacturing a light guide body according to claim 3, wherein an index of refraction of the light scatterer is different from that of polymethyl methacrylate.

* * * * *